US 8,444,884 B2

(12) United States Patent
Futterer et al.

(10) Patent No.: US 8,444,884 B2
(45) Date of Patent: *May 21, 2013

(54) FLAME-PROOFED POLYMER MATERIAL

(75) Inventors: Thomas Futterer, Ingelheim (DE); Hans-Dieter Naegerl, Dudenhofen (DE); Vincens Mans Fibia, Badalona (ES); Siegfried Mengel, Budenheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/452,888

(22) PCT Filed: Jul. 25, 2008

(86) PCT No.: PCT/EP2008/059829
§ 371 (c)(1),
(2), (4) Date: Apr. 16, 2010

(87) PCT Pub. No.: WO2009/016129
PCT Pub. Date: Feb. 5, 2009

(65) Prior Publication Data
US 2010/0227952 A1    Sep. 9, 2010

(30) Foreign Application Priority Data
Jul. 28, 2007  (DE) .................. 10 2007 035 417

(51) Int. Cl.
*C09K 21/00* (2006.01)
(52) U.S. Cl.
USPC .......................................... 252/606; 252/609
(58) Field of Classification Search
USPC .................................. 252/609, 606
See application file for complete search history.

(56) References Cited

U.S. PATENT DOCUMENTS

| | | | |
|---|---|---|---|
| 4,504,610 A * | 3/1985 | Fontanelli et al. ............... 524/96 |
| 4,639,331 A * | 1/1987 | Elsner et al. .................... 252/609 |
| 4,966,931 A | 10/1990 | Akitaya et al. | |
| 5,116,891 A | 5/1992 | Eberspach et al. | |
| 5,153,245 A | 10/1992 | Cipolli et al. | |
| 5,391,611 A * | 2/1995 | Funayama et al. ............. 524/508 |
| 5,430,081 A * | 7/1995 | Ohmae et al. .................. 524/100 |
| 5,795,930 A * | 8/1998 | Fukumura et al. ............. 524/100 |
| 5,830,582 A | 11/1998 | Hase et al. | |
| 6,444,736 B1 | 9/2002 | Touhara et al. | |
| 6,753,363 B1 | 6/2004 | Harashina | |
| 2004/0254270 A1 * | 12/2004 | Harashina ........................ 524/86 |

FOREIGN PATENT DOCUMENTS

| | | |
|---|---|---|
| DE | 4003231 A1 | 8/1991 |
| DE | 19615897 A1 | 10/1997 |
| DE | 19983137 B4 | 4/2001 |
| EP | 0115871 A2 | 8/1984 |
| EP | 0326082 A2 | 8/1989 |
| EP | 0391336 A2 | 10/1990 |
| EP | 0627460 A1 | 12/1994 |
| EP | 0686661 A1 | 12/1995 |
| EP | 0779333 A2 | 6/1997 |
| EP | 0832737 A1 | 4/1998 |
| JP | 9221567 A | 8/1997 |
| JP | 9268236 A | 10/1997 |
| JP | 10204212 A | 8/1998 |
| JP | 2003003017 A | 1/2003 |

OTHER PUBLICATIONS

SpecialChem4Polymers (http://www.specialchem4polymers.com/tc/ammonium-polyphosphate/index.aspx?id=description, Aug. 28, 2006).*

* cited by examiner

Primary Examiner — Edward Cain
(74) Attorney, Agent, or Firm — Michael L. Dunn

(57) ABSTRACT

The invention relates to a polymer material comprising a halogen-free flame-proofing agent incorporated into the polymer matrix, the flame-proofing agent comprising at least ammonium polyphosphate(s) and/or derivatives thereof and an oligomer or polymer 1,3,5-triazine derivative or mixtures of a plurality thereof and at least one compound selected from phosphates, pyrophosphates, polyphosphates, organic and inorganic phosphonates, organic and inorganic phosphinates, stannates, molybdates or borates of the elements of the main groups II, III, IV or of the sub-group elements Fe, Zn, Ti, Mn, Zr, Mo, pre-condensed melamine derivatives, melamine salts and addition compounds, ethylene diamine phosphate, piperazine phosphate, piperazine polyphosphate, 1,3,5-trihydroxyethyl isocyanurate, 1,3,5-triglycidyl isocyanurate and triallyl isocyanurate. The weight ratio of constituents A to constituents B is 10:1 to 1:1, constituents A and B together amounting to between 60 and 99 wt. % and constituents C and D to between 1 and 40 wt. % of the total weight of constituents A, B, C and D. The polymer material is a thermoplastic elastomer (TPE).

18 Claims, No Drawings

FLAME-PROOFED POLYMER MATERIAL

CROSS REFERENCE TO RELATED APPLICATIONS

This is a United States Nationalization of PCT Application PCT/EP2008/059829 filed Jul. 25, 2008 which in turn claims priority from German Patent Application 10 2007 035 417.9 filed Jul. 28, 2007.

BACKGROUND OF THE INVENTION

Thermoplastic polymers, including thermoplastic elastomers, are used in many fields, for example in the electrical and electronics field, in the construction field, in building technology, in automotive production and in public transport vehicles. They have advantageous mechanical properties and good processability and chemical stability. One possible way of making such polymers flame resistant is the addition of halogen-containing flame retardants with antimony trioxide. A further possibility is the addition of halogen-free substances such as metal hydroxides, organic or inorganic phosphates or phosphonates, for example ammonium polyphosphates, together with synergistically active substances such as carbon sources and blowing agents.

The halogen-free flame retardants in particular are gaining increasing importance since in contrast to flame retardants which contain chlorinated or brominated organic compounds, they cause less fume evolution in case of fire and are as a rule classified as environmentally friendly. Among the fire retardant substances, derivatives of phosphoric acid, pyrophosphoric and the polyphosphoric acids are mainly used in halogen-free flame retardants. Ammonium and melamine derivatives of the aforesaid substances and piperazine phosphate and ethylenediamine phosphate have the property that when they are incorporated in moulding compositions they swell into voluminous protective layers at high temperatures and act as an insulating layer against a heat source. This property can be further reinforced by synergistically active substances. In contrast to the mode of action of halogen-containing flame retardants, the swelling, so-called intumescence, takes place without the evolution of substantial quantities of fumes.

The use of the aforesaid flame retardants in polyolefins often does not provide sufficient protection and in addition synergistically active substances such as for example carbon sources and blowing agents must be added. In order to ensure adequate effectiveness of such flame retardant compositions, a very high proportion of flame retardant must often be added to the polymer, which leads in particular to alteration of the mechanical and electrical properties of the polymer.

The previously particularly effective flame retardants include mixtures of ammonium polyphosphate with amines, such as for example mixtures with melamine compounds and/or pentaerythritol. Further well-known intumescent mixtures are based on ammonium polyphosphates in combination with THEIC (1,3,5-tris-hydroxyethylisocyanuric acid).

However the disadvantage of these mixtures consists in the fact that even after introduction into a polymer they display very high water solubility so that they are partially leached out and consequently their effect can no longer be obtained. Furthermore they have a low decomposition temperature, which already to some extent leads to decomposition of the flame retardant additive during the moulding of the plastic objects from the polymer to be protected. Furthermore in spite of improved effectiveness these mixtures must be used in high concentrations in a polymer as a result of which the processability and flexibility of the polymer is decreased.

BRIEF SUMMARY OF THE INVENTION

In the light of this background, the purpose of the invention is to provide a polymeric material which has a halogen-free flame retardant incorporated into the polymer matrix, in which the halogen-free flame retardant has improved flame resistant action compared to the state of the art, is usable in smaller concentrations in a polymeric material while at the same time having good flame resistant action, has low water solubility, and only decomposes at higher temperatures than known flame retardants, preferably above the processing temperature of the polymers, and the polymeric material has good material properties, good flame resistance and at the same time good water resistance.

According to the invention, the problem is solved by a polymeric material which has a halogen-free flame retardant incorporated into the polymer matrix, wherein the flame retardant contains at least the following components A and B:
A. ammonium polyphosphate(s) and/or derivatives thereof,
B. an oligomeric or polymeric 1,3,5-triazine derivative or mixtures of several thereof of the general formula

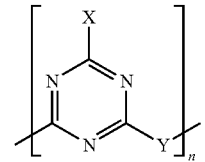

wherein X is a morpholino residue, a piperidino residue or a group derived from piperazine,
Y is a divalent group derived from piperazine and
n is a whole number greater than 1,
and at least one compound selected from the following components C and D:
C. phosphates, pyrophosphates, polyphosphates, organic and inorganic phosphonates, organic and inorganic phosphinates, stannates, molybdates or borates of the elements of the main groups II, III or IV or the transition group elements Fe, Zn, Ti, Mn, Zr and Mo,
D. precondensed melamine derivatives, melamine salts and adducts, ethylenediamine phosphate, piperazine phosphate, piperazine polyphosphate, 1,3,5-trihydroxyethyl isocyanurate, 1,3,5-triglycidyl isocyanurate and triallyl isocyanurate,
wherein the weight ratio of the component A to the component B is from 10:1 to 1:1 and the components A and B together make up 60 to 99 wt. % and the components C and D together make up 1 to 40 wt. % of the total weight of the components A, B, C and D, and
wherein the polymeric material is a thermoplastic elastomer (TPE).

DETAILED DESCRIPTION OF THE INVENTION

In one embodiment of the invention, the polymeric material contains the halogen-free flame retardant in a quantity of 5 to 60 wt. %, preferably in a quantity of 10 to 40 wt. %. Component A includes both coated and also uncoated ammonium polyphosphate(s) and/or derivatives thereof.

Here the term "coated ammonium polyphosphates" includes both simply coated ammonium polyphosphate and also coated and crosslinked ammonium polyphosphate. The effect of such a coating is that, in contrast to uncoated ammonium polyphosphate, on addition of the flame retardant to a polymer it results in increased thermal stability, lower water solubility and improved compatibility with the polymer matrix in which the flame retardant is used. The component A is obtainable by coating of a powder or granules of ammonium polyphosphate or a derivative thereof.

The component A is added to the flame retardant as a powder or granules and in the event of a fire produces markedly fewer fumes than halogen-containing flame retardants.

Component B is an oligomer or polymer of a 1,3,5-triazine derivative or a mixture of several thereof, and it is a substance also having flame retardant action in combination with phosphates. Component B is decomposed by the action of intense heat or contact with a flame, with the generation of non-inflammable gases, including water, carbon dioxide, ammonia and nitrogen, with formation of a carbon-containing residue. The component B acts as a carbon source in the intumescent mixture according to the invention.

The weight ratio of the components A and B of 10:1 to 1:1 results in optimal flame resistant action. A lower or higher proportion of the component B would decrease the effectiveness of the flame retardant. In this connection the weight ratio of the component A to the component B is preferably from 6:1 to 2:1 and particularly preferably from 5:1 to 3:1.

Further it is preferable if the components A and B together make up from 85 to 99 wt. % and particularly preferably from 90 to 95 wt. % and the components C and D together preferably make up from 1 to 15 wt. % and particularly preferably from 5 to 10 wt. % of the total weight of the components A, B, C and D.

Component C contains substances, in particular salts, which in the flame retardant according to the invention cause a further reduction in the evolution of fumes. As a result, the toxicity caused by fumes during fires is markedly reduced and at the same time the action of the flame retardant is improved. In addition, this component results in higher efficiency of the flame retardant and improved mechanical properties of the polymer in which the flame retardant is used.

Component D contains precondensed melamine derivatives and/or melamine salts and adducts, ethylenediamine phosphate, piperazine phosphate, piperazine polyphosphate, 1,3,5-trihydroxyethyl isocyanurate, 1,3,5-triglycidyl isocyanurate, triallyl isocyanurate or mixtures thereof. Examples of precondensed melamine derivatives are melem, melon, melam, melamine cyanurate, melamine borate, melamine orthophosphate, melamine pyrophosphate, dimelamine pyrophosphate and melamine polyphosphate.

The compounds of the component D act as blowing agents. The precondensed melamine derivatives and/or melamine salts and adducts are so stable that during the processing of a plastic which contains the flame retardant no condensation reaction or decomposition reaction takes place and as a result the processability of the plastic is considerably improved. At the same time the flame retardant action is retained.

The compounds of the component D have a decomposition temperature comparable with or higher than that of ammonium polyphosphate and therefore reinforce the efficacy of the ammonium polyphosphate or derivatives thereof. On use in a plastic, the stability, process-ability and mechanical strength thereof are maintained.

The components of the flame retardant according to the invention in the composition according to the invention also contribute to the improvement of the mechanical properties of a polymer in which the flame retardant is used.

A further advantage of the flame retardant according to the invention is that in comparison to conventional flame retardants it can be used in smaller quantities with equally good or better action and as a result the costs of a plastic thus treated are also reduced and the mechanical properties thereof are less strongly influenced or impaired. Even at a concentration of less than 30% in a thin film plastic, the flame retardants according to the invention achieve a very good flame retardant action.

Preferably the component A is or contains coated ammonium polyphosphate and/or derivatives thereof. The coating of the component A effects not only a marked reduction in the water solubility, but also increased temperature stability of the ammonium polyphosphate, reduced reactivity of the ammonium polyphosphate with other components of the flame retardant and increased compatibility with the polymer in which the flame retardant is used.

According to one embodiment the component A in the flame retardant according to the invention is selected from coated ammonium polyphosphates of the crystal forms I, II or V or mixtures thereof.

Particularly preferably, component A contains coated and/or uncoated ammonium poly-phosphate of the crystal form II, which compared to the other crystal forms is almost insoluble in water. This is a powdery substance which has a good flame retardant action at the same time as low water solubility even without coating. The advantage of the use of coated ammonium polyphosphate of the crystal form II consists in the fact that this has higher thermal stability and higher compatibility with polymers, so that as a result improved dispersion of the flame retardant in the polymer, an improved processing profile of the polymer and more efficient fire protection are achieved.

Preferably here the ammonium polyphosphate and/or derivatives thereof is/are coated with melamine, melamine resin, melamine derivatives, silanes, siloxanes or polystyrenes. An ionic bond is formed between the particulate ammonium polyphosphate and/or derivative thereof and the coating material, during which the ammonia bound to the ammonium polyphosphate is replaced by the coating material. This bond is very stable so that during the processing of the plastic the coating is largely stable.

The production of melamine-coated ammonium polyphosphate is effected at temperatures of more than 250° C. Here, the reaction time is designed such that any excess melamine completely reacts with the surface of the ammonium polyphosphate, replaces ammonia in the process and is bonded better.

Also preferred is the coating of the ammonium polyphosphate particles with melamine, melamine resin, melamine derivatives, silanes, siloxanes or polystyrenes, followed by crosslinking. The crosslinking of the melamine coating effects a further reduction in the water solubility of the ammonium polyphosphate and is as a rule performed with formaldehyde. The process is known to the person skilled in the art.

Preferably, the content of the coating of the ammonium polyphosphates and/or of the derivatives thereof is 0.1 to 20 wt. %, preferably 1 to 10 wt. %, based on the total weight of the coated ammonium polyphosphates and/or of the derivatives thereof. With such a ratio of ammonium polyphosphate to coating, optimal protection of the ammonium polyphosphate is ensured, which also leads to optimal combinability of the ammonium polyphosphate with a polymer in which the flame retardant is to be used. At the same time with this ratio the coating is not present in such an excess that detachment of free coating material which is less strongly bound to ammonium polyphosphate takes place.

Particularly preferably, the average particle size D50 of the coated particles of ammonium polyphosphate or a derivative thereof is from 5 µm to 30 µm, in particular from 5 µm to 20 µm and particularly preferably between 7 µm and 18 µm, including the coating. Larger particles cannot be sufficiently homogeneously dispersed in a polymer and would as a result under some circumstances adversely affect its properties. Smaller particles are likewise less preferred, since they are difficult to meter.

In the coated ammonium polyphosphate and/or derivative thereof the average particle size D50 of the particles of ammonium polyphosphate and/or of the derivatives thereof as the core of the coated particles is preferably about 7 µm. Also achieved thereby in particular is that the flame retardants according to the invention display higher decomposition temperatures and hence very high temperature stability in comparison to previously known flame retardants.

As component B, an oligomeric or polymeric 1,3,5-triazine derivative wherein n is a whole number from 2 to 50, particularly preferably from 2 to 30 and especially preferably from 3 to 9, is preferably used. In the production of such oligomers or polymers, mixtures of different chain lengths are usually formed. Such mixtures arising during the polymerisation, wherein more than 70%, preferably more than 80%, and particularly preferably more than 90% of the oligomers and polymers used have a chain length of n=2 to 50, preferably of n=2 to 30 and particularly preferably of n=3 to 9, can also be used. Both heteropolymers and also homopolymers can be used here.

Preferred monomers of the 1,3,5-triazine derivative as in component B are 2-piperazinylene-4-morpholino-1,3,5-triazine and 2-piperazinylene-4-piperidino-1,3,5-triazine. Mixed oligomers or polymers of the aforesaid substances can also be used. The synergistic effect of the said polymers or oligomers with coated ammonium polyphosphate and/or derivatives thereof in particular effects an increase in the efficiency of the flame retardant.

Preferred compounds as in component C which further improve the effectiveness of the flame retardant and in particular enable addition of a smaller quantity of the flame retardant are metal salts, in particular monozinc phosphate $Zn(H_2PO_4)_2$, zinc borate, trizinc phosphate $Zn_3(PO_4)_2$, zinc pyrophosphate $Zn_2P_2O_7$, zinc polyphosphate of the general formula $oZnO \cdot pP_2O_3 \cdot qH_2O$, wherein o and p are from 1 to 7 and q is from 0 to 7, zinc hydroxystannate $ZnSn(OH)_6$, zinc stannate $ZnSnO_3$, boron phosphate $BPO_4$, monoaluminium phosphate $Al(H_2PO_4)_3$, trialuminium phosphate $AlPO_4$, aluminium metaphosphate $[Al(PO_3)_3]_n$, ammonium octamolybdate (AOM) and mixtures thereof. With these salts in particular it has surprisingly been found that through the interaction with the components A and B outstanding action of the flame retardant is achieved, which even with a small added quantity in polymers leads to classification in the highest fire retardancy class.

Among the precondensed melamine derivatives, melamine salts and melamine adducts of the component D, melem, melon and melam are preferred. Further preferred compounds of the component D are melamine cyanurate, melamine borate, melamine orthophosphate, melamine pyrophosphate, dimelamine pyrophosphate and melamine polyphosphate. The addition of these substances effects a further improvement in the flame retardant, with these substances in small quantities also acting as blowing agents.

The polymeric material according to the invention is a thermoplastic elastomer which preferably contains the flame retardant according to the invention in a quantity of 5 to 60 wt. %, particularly preferably in a quantity of 10 to 40 wt. %. Even with low film thicknesses of e.g. only 0.8 mm, such flame-retarded polymers fulfil the highest fire protection requirements even with highly inflammable plastics. At the same time by means of the flame retardant according to the invention the flexibility and processability of the flame retardant treated plastics is improved compared to known plastics treated with flame retardants.

Preferred polymeric materials, namely thermoplastic elastomers, are selected from filled and unfilled olefin-based thermoplastic elastomers (TPO), crosslinked olefin-based thermoplastic elastomers, urethanes (TPU), polyesters and co-polyesters (TPC), styrene block copolymers (TPS) and polyamides and co-polyamides (TPA). In particular in the use of the flame retardant according to the invention with olefin-based thermoplastic elastomers, crosslinked olefin-based thermoplastic elastomers and styrene block copolymers, the mechanical properties of the plastics, in particular their abrasion resistance, are favourably influenced. Hence such flame retardant treated thermoplastic elastomers can in particular be used as a substitute for PVC in cables, wiring systems, tubes for electric cables and the pipework of wastewater systems. Particularly preferably, the thermoplastic elastomer according to the invention is selected from styrene block copolymers (TPS), preferably from the styrene block copolymers SBS (styrene-butadiene-styrene), SEBS (styrene-ethene-butene-styrene), SEPS (styrene-ethene-propene-styrene), SEEPS (styrene-ethene-ethene-propene-styrene) and MBS (methacrylate-butadiene-styrene).

Thermoplastic elastomers, in particular styrene block copolymers, are relatively readily inflammable, as a rule more readily than many other types of polymer, inter alia because they contain a high proportion of oils which increase the inflammability. It was therefore particularly surprising that thermoplastic elastomers could be flame retarded at all and in particular as effectively as is achieved according to the invention with the flame retardants according to the invention. Admittedly the proportion of flame retardant in the polymer matrix necessary for achieving good flame retardant action is as a rule somewhat higher than with some other types of polymer, however for very many types of thermoplastic elastomer this higher proportion of flame retardants does not adversely affect the mechanical and other properties significantly.

Further, apart from the flame retardant according to the invention, the polymeric material preferably contains other fillers which are selected from calcium carbonate, silicates such as talc, clay or mica, silica, calcium and barium sulphate, aluminium hydroxide, glass fibres and glass beads and also wood flour, cellulose powder and soots and graphites. These fillers can impart other desired properties to the plastics. In particular the price of the plastic can be decreased thereby, and the plastic can be coloured or desired mechanical properties of the plastic can be improved, e.g. by reinforcement with glass fibres.

In a further embodiment of the polymeric material according to the invention, the component B in the halogen-free flame retardant has a chlorine content of <1 wt. %, preferably <0.8 wt. %. This is particularly advantageous compared to the state of the art, since with known flame retardants undesirably large quantities of chlorine are introduced in the form of inorganically and organically bound chlorine.

In a further embodiment of the invention, the polymeric material overall has a chlorine content of <1500 wt. ppm, preferably <900 wt. ppm. This is particularly advantageous compared to the state of the art, since with known flame retardants undesirably large quantities of chlorine were introduced in the form of inorganically and organically bound chlorine. The term "halogen-free" in the sense of the invention allows low levels of chlorine impurities in the aforesaid maximum quantities. However, chlorine or halogen in general should generally be kept low, in order to avoid the adverse effects of the halogens.

In a further embodiment of the polymeric material according to the invention, dispersion aids are contained in the halogen-free flame retardant in a quantity of 0.01 to 10 wt. %, preferably in a quantity of 0.1 to 5.0 wt. %, the dispersion aids preferably being selected from fatty acid amides, including fatty acid monoamides, fatty acid bisamides, and fatty acid alkanolamides such as oleamides and erucamides, from fatty acid esters, including glycerine esters and wax esters, from C16 to C18 fatty acids, from fatty acid alcohols, including cetyl and stearyl fatty acid alcohols, from natural and synthetic waxes, polyethylene waxes and oxidised polyethylene waxes and from metal stearates, preferably Ca, Zn, Mg, Ba, Al, Cd and Pb stearates. The addition of the aforesaid dispersion aids improves the meterability of the flame retardant, the extrudability of the polymeric material and the homogeneity of the dispersed flame retardant within the polymer matrix.

In a further embodiment of the polymeric material according to the invention, the halogen-free flame retardant has a free water content (moisture content) of <0.6 wt. %, preferably <0.4 wt. %. A low water content also improves the meterability of the flame retardant, the extrudability of the polymeric material and the homogeneity of the dispersed flame retardant within the polymer matrix.

EXAMPLES

Some examples are presented below, which include both polymers according to the invention and not according to the invention, and the flame retardants used therein.

For the examples, test pieces for various tests were prepared in a Brabender plastic kneader. For this, a polymer with no added flame retardant was first melted with stirring. Next, the components A and B, and C and/or D were added to the melt in one step as a mixture or consecutively. After a homogenisation phase of 10 to 15 minutes, the plastic material was removed and pressed into plates with thicknesses of 0.8 mm and 1.6 mm by means of a heatable press. The pressed plates were cut into suitable test pieces using a saw and subjected to the tests described below.

The compositions of the different test pieces or comparison test pieces are given below in table form. The triazine derivative used is a polymer of 2-piperazinylene-4-morpholino-1, 3,5-triazine. Further, an uncoated ammonium polyphosphate (FR CROS 484), a melamine-coated ammonium polyphosphate (FR CROS C40) or a melamine-coated and crosslinked ammonium polyphosphate (FR CROS 498) was used (Manufacturer: Chemische Fabrik Budenheim in each case). As melamine polyphosphate, Budit 3141 (Manufacturer: Budenheim Iberica) or Melapur 200 (Manufacturer: CIBA) were used. The aluminium phosphate used is Fabutit (Manufacturer: Chemische Fabrik Budenheim), and the melamine cyanurate is obtainable from Budenheim Iberica as Budit 315.

The examples designated only by a number and with no V are examples according to the invention. The examples identified by V and a number are comparison examples not according to the invention.

UL94 Vertical Test

To carry out the UL94 vertical test, referred to below as UL94 V, sets of five test pieces each with a thickness of 1.6 mm or 0.8 mm were clamped in a vertical position at one end. A Bunsen burner flame was held at the free end of the test piece twice for 10 seconds. After this, the time to extinction of the flame or glowing of the test piece was measured in each case. At the same time it was noted whether ignited drops of the test piece could ignite cotton lying under it.

In each case, "TBT" indicates the sum of the burn times of a total of five test pieces in seconds.

The tests were performed in accordance with the instructions of Underwriter Laboratories, Standard UL 94V. "UL94" indicates the fire retardancy classification of the test piece, V0 meaning that the total burn time of five tested test pieces was less than 50 seconds and cotton was not ignited by glowing or burning components of the test piece dropping down. The classification V2 means that the total burn time of five tested test pieces together was less than 250 seconds, however a cotton cloth was ignited by test piece components dropping down.

LOI Test

The lowest oxygen concentration in an $N_2/O_2$ mixture at which a sample just still continues to burn alone after ignition is the LOI value (limiting oxygen index). The higher the LOI value, the more flame resistant the sample. Here LOI values over 30% are very good. A high LOI is particularly important for complying with standards which are required in the cable industry.

The test was performed in accordance with DIN EN ISO 4589 part 2. The test pieces were of size 1.25 mm×3.0×6.5 mm.

The results of the tests are reproduced below in table form. The LOI is stated in percent.

Testing of the Decomposition Temperature of the Flame Retardant

As a further test, various flame retardant compositions were heated alone without incorporation into a polymer, and the temperature from which decomposition takes place was noted. The decomposition temperature is usually stated as the temperature at which a weight loss of 2% occurs.

These tests were performed by thermogravimetry. For this in each case a quantity of 10 mg of a flame retardant was placed in a crucible and heated to temperatures over 350° C. at a temperature increase rate of 10 Kelvin/min. During the heating, the weight change of the sample was measured.

The results of these tests are reproduced below in table form.

Particularly with test pieces with film thicknesses of 0.8 mm, it is clear that the polymers containing flame retardants according to the invention achieve a marked improvement compared to the comparative examples with similar previously used flame retardants. Polymeric materials according to the invention almost all reach the highest fire classification of V0 in the UL 94 test at a film thickness of 0.8 mm, while this is not the case for the comparison examples.

In particular the attainment of the highest fire retardancy classification at very low film thicknesses and a low flame retardant content and a good fire retardancy classification opens up the possibility of flame retardant treatment of thermoplastic elastomers with very low film thicknesses, and thereby opening up new possible applications of halogen-free intumescent fire retardants. These include coverings of cables, cable ducts, sheeting, electronic components, housings for electrical and electronic devices, etc. Furthermore, in the production of such materials it is advantageous that the flame retardants according to the invention achieve excellent effects in the thermoplastics used and as a result the mechanical properties of the polymers thus treated remain unchanged. The flame retardants according to the invention are also characterised by very low fume evolution.

All the flame retardants according to the invention or polymers treated with flame retardants according to the invention and thus polymers according to the invention have both a very short burn time and also a very high oxygen index and a very high decomposition temperature. In addition, the polymers are processable so that replacement of environmentally harmful PVC with polymers according to the invention is possible.

TABLE 1

Compositions

| | Component | 1 | 2 | 3 | 4 | 5 | 6 | 7 | 8 | 9 | 10 | 11 | V1 | V2 | V3 | V4 | V5 | V6 |
|---|---|---|---|---|---|---|---|---|---|---|---|---|---|---|---|---|---|---|
| A | FR CROS 489 | 34 | | | 34 | 34 | 34 | 34 | 34 | 34 | 34 | 34 | | 34 | | | | |
| A | FR CROS C 40 | | 34 | | | | | | | | | | 20 | | | | | |
| A | FR CROS 484 | | | 34 | | | | | | | | | | | | | | |
| B | triazine compound | 8 | 8 | 8 | 8 | 8 | 8 | 8 | 8 | 8 | 8 | 8 | 5 | | | | | |
| X | pentaerythritol (comparison) | | | | | | | | | | | | | 8 | | | | |
| C | zinc pyrophosphate | | | | | | | | | 1.5 | | | | | | | | |
| C | zinc borate | | | | | | | | | | 1.5 | | | | | | | |
| C | aluminium phosphate | | | | | | | | | | | 1.5 | | | | | | |
| D | melamine cyanurate | 3 | 3 | 3 | 3 | 3 | | | | 1.5 | 1.5 | 1.5 | | 3 | | | | |
| D | melem | | | | | | 3 | | | | | | | | | | | |
| D | melon | | | | | | | 3 | | | | | | | | | | |
| D | melamine polyphosphate | | | | | | | | 3 | | | | | | | | | |
| Additive | magnesium hydroxide | | | | | | | | | | | | | | 45 | 55 | 45 | 45 |
| Plastic | TPS | 55 | 55 | 55 | | | 55 | 55 | 55 | 55 | 55 | 55 | 55 | 55 | 45 | | | |
| Plastic | TPA | | | | 55 | | | | | | | | | | | | 55 | |
| Plastic | TPO | | | | | 55 | | | | | | | | | | | | 55 |
| Plastic | PP | | | | | | | | | | | | | | | 75 | | |
| Plastic | HDPE | | | | | | | | | | | | | | | | | |

TPS: SEBS = styrene-ethylene-butylene-styrene

TPA: polyether polyamide block copolymer

TPO: thermoplastic polyolefin with non-crosslinked elastomer phase

PP: polypropylene

HDPE: high density polyethylene

TABLE 2

Results of fire retardancy tests

| Test | Film thickness | 1 | 2 | 3 | 4 | 5 | 6 | 7 | 8 | 9 | 10 | 11 | V1 | V2 | V3 | V4 | V5 | V6 |
|---|---|---|---|---|---|---|---|---|---|---|---|---|---|---|---|---|---|---|
| TBT | 1.6 mm | 15 | 11 | 22 | 16 | 19 | 16 | 17 | 16 | 14 | 13 | 13 | 25 | >50 | >50 | >50 | >50 | >50 |
| UL 94 | 1.6 mm | V0 | V0 | V0 | V0 | V0 | V0 | V0 | V0 | V0 | V0 | V0 | V0 | V2 | V2 | V1 | V2 | V2 |
| TBT | 0.8 mm | 25 | 22 | >50 | >50 | 30 | 28 | 30 | 29 | 26 | 25 | 26 | >50 | >50 | >50 | >50 | >50 | >50 |
| UL 94 | 0.8 mm | V0 | V0 | V2 | V2 | V0 | V0 | V0 | V0 | V0 | V0 | V0 | V2 | n.c. | n.c. | n.c. | n.c. | n.c. |
| LOI | 1.25 mm | 31 | 32 | 28 | 29 | 31 | 30 | 31 | 31 | 34 | 33 | 33 | 32 | 21 | 25 | 27 | 25 | 27 | n.c. = not classifiable (worse than V2)

TABLE 3

2% weight loss of flame retardant (with no plastic)

| Example No. | 1 | 2 | 3 | 4 | 5 | 6 | 7 | 8 | 9 | 10 | 11 | V1 | V2 | V3 | V4 | V5 | V6 |
|---|---|---|---|---|---|---|---|---|---|---|---|---|---|---|---|---|---|
| Temperature in °C. | 312 | 319 | 313 | n.t. | n.t. | n.t. | n.t. | n.t. | n.t. | n.t. | n.t. | 319 | 280 | 315 | n.t. | n.t. | n.t. | n.t. = not tested

What is claimed is:

1. Polymeric material which has a halogen-free flame retardant incorporated into the polymer matrix, wherein the flame retardant contains at least the following components A and B:
   A. ammonium polyphosphate(s) and/or derivatives thereof,
   B. an oligomer or polymer of a 1,3,5-triazine derivative or mixtures of several thereof each oligomer or polymer having the general formula

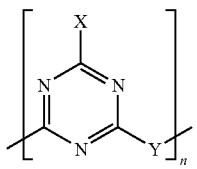

wherein
   X is a morpholino residue, a piperidino residue or a group derived from piperazine,
   Y is a divalent group derived from piperazine and
   n is a whole number greater than 1,
   and at least one compound selected from the following components C and D:
   C. phosphates, pyrophosphates, polyphosphates, organic and inorganic phosphonates, organic and inorganic phosphinates, stannates, molybdates or borates of the elements of the main groups II, III or IV or the transition group elements Fe, Zn, Ti, Mn, Zr and Mo,
   D. precondensed melamine derivatives, melamine salts and adducts, ethylenediamine phosphate, piperazine phosphate, piperazine polyphosphate, 1,3,5-trihydroxyethyl isocyanurate, 1,3,5-triglycidyl isocyanurate and triallyl isocyanurate,
      wherein the weight ratio of the component A to the component B is from 10:1 to 1:1 and the components A and B together make up 60 to 99 wt. % and the components C and D together make up 1 to 40 wt. % of the total weight of the components A, B, C and D, and wherein the polymeric material is a thermoplasic elastomer (TPE).

2. Polymeric material according to claim 1, wherein it contains the halogen-free flame retardant in a quantity of 5 to 60 weight percent.

3. Polymeric material according to claim 1, wherein the thermoplastic elastomer (TPE) is selected from olefin-based thermoplastic elastomers (TPO), crosslinked olefin-based thermoplastic elastomers, urethanes (TPU), polyesters and co-polyesters (TPC), styrene block copolymers (TPS), polyamides and co-polyamides (TPA).

4. Polymeric material according to claim 1 wherein the thermoplastic elastomer is selected from SBS (styrene-butadiene-styrene), SEBS (styrene-ethene-butene-styrene), SEPS (styrene-ethene-propene-styrene), SEEPS (styrene-etheneethene-propene-styrene) and MBS (methacrylate-butadienestyrene).

5. Polymeric material according to claim 1, wherein the polymeric material contains fillers selected from calcium carbonate, silicate, talc, clay, mica, silica, calcium sulphate, barium sulphate, aluminium hydroxide, glass fibres and beads, wood flour, cellulose powder, soot and graphite.

6. Polymeric material according to claim 1, wherein the component A in the halogen-free flame retardant is or includes coated ammonium polyphosphate.

7. Polymeric material according to claim 1, wherein the ammonium phosphate in component A is of the crystal form II, and/or derivatives thereof.

8. Polymeric material according to claim 6, wherein in the halogen-free flame retardant, the ammonium polyphosphates and/or derivatives thereof in component A are particles coated with melamine, melamine resin, melamine derivatives, silanes, siloxanes and/or polystyrenes and/or particles coated with melamine, melamine resin, melamine derivatives, silanes, siloxanes or polystyrenes and crosslinked.

9. Polymeric material according to claim 1, wherein in the halogen-free flame retardant the proportion of the coating of the ammonium polyphosphates and/or of the derivatives thereof as in component A is 0.1 to 20 percent by weight based on the total weight of the coated ammonium polyphosphates and/or derivatives thereof.

10. Polymeric material according to claim 6, wherein in the halogen-free flame retardant the coated ammonium polyphosphates and/or derivatives thereof in component A including coating have an average particle size D50 from 5 to 30 µm.

11. Polymeric material according to claim 1, wherein in the halogen-free flame retardant in the component A, n is a whole number from 2 to 50.

12. Polymeric material according to claim 1, wherein in the halogen-free flame retardant, the 1,3,5-triazine derivative in component B is selected from oligomers and polymers of 2-piperazinylene-4-morpholino-1,3,5-triazine and 2-piperazinylene-4-piperidino-1,3,5-triazine and combinations of the aforesaid compounds.

13. Polymeric material according to claim 1 wherein, in the halogen-free flame retardant, component C is selected from monozinc phosphate, zinc borate, trizinc phosphate, zinc pyrophosphate, zinc polyphosphate, zinc hydroxystannate, zinc stannate, boron phosphate, monoaluminium phosphate, trialuminium phosphate, aluminium metaphosphate and mixtures thereof.

14. Polymeric material according to claim 1, wherein, in the halogen-free flame retardant, component D is selected from melem, melon, melam, melamine cyanurate, melamine borate, melamine orthophosphate, melamine pyrophosphate, dimelamine pyrophosphate and melamine polyphosphate.

15. Polymeric material according to claim 1 wherein, in the halogen-free flame retardant, component B has a chlorine content of less than one percent by weight, and/or the whole polymeric material has a chlorine content of <1500 wt. ppm by weight.

16. Polymeric material according to claim 1 wherein, in the halogen-free flame retardant dispersion aids are contained in a quantity of 0.01 to 10 percent by weight, wherein the dispersion aid is selected from a fatty acid amide from a group including fatty acid monoamides, fatty acid bisamides, and fatty acid alkanolamides such as oleamides and erucamides, from fatty acid esters from a group including glycerine esters and wax esters, from C16 to C18 fatty acids, from fatty acid alcohols from a group including cetyl and stearyl fatty acid alcohols, from natural and synthetic waxes, polyethylene waxes and oxidised polyethylene waxes and from Ca, Zn, Mg, Ba, Al, Cd and Pb metal stearates.

17. Polymeric material according to claim 1 wherein the halogen-free flame retardant has a free water content (moisture content) of less than 0.6 weight percent.

18. Polymeric material according to claim 6 wherein the halogen-free flame retardant has a free water content (moisture content) of less than 0.6 weight percent.

* * * * *

UNITED STATES PATENT AND TRADEMARK OFFICE
CERTIFICATE OF CORRECTION

PATENT NO. : 8,444,884 B2
APPLICATION NO. : 12/452888
DATED : May 21, 2013
INVENTOR(S) : Thomas Futterer et al.

It is certified that error appears in the above-identified patent and that said Letters Patent is hereby corrected as shown below:

Title Page, item (75),
"Fibia" should read --Fibla--
Inventors: Vincens Mans Fibla, Badalona (ES)

Signed and Sealed this
First Day of October, 2013

Teresa Stanek Rea
*Deputy Director of the United States Patent and Trademark Office*